(12) United States Patent
Engbrocks

(10) Patent No.: US 7,177,046 B2
(45) Date of Patent: Feb. 13, 2007

(54) METHOD FOR PRODUCING AND OUTPUTTING AT LEAST ONE PRINTED PAGE

(75) Inventor: Werner Engbrocks, Poing (DE)

(73) Assignee: Oce Printing Systems GmbH, Poing (DE)

(*) Notice: Subject to any disclaimer, the term of this patent is extended or adjusted under 35 U.S.C. 154(b) by 575 days.

(21) Appl. No.: 10/240,135

(22) PCT Filed: Apr. 11, 2001

(86) PCT No.: PCT/EP01/04193

§ 371 (c)(1),
(2), (4) Date: Apr. 11, 2003

(87) PCT Pub. No.: WO01/78000

PCT Pub. Date: Oct. 18, 2001

(65) Prior Publication Data
US 2003/0169452 A1 Sep. 11, 2003

(30) Foreign Application Priority Data
Apr. 11, 2000 (DE) .................... 100 17 893

(51) Int. Cl.
G06K 15/00 (2006.01)
G06F 3/12 (2006.01)

(52) U.S. Cl. .................... 358/1.18; 358/1.13

(58) Field of Classification Search .......... 358/1.18, 358/1.2, 1.6, 1.9, 2.1, 3.24, 1.13
See application file for complete search history.

(56) References Cited

U.S. PATENT DOCUMENTS

| | | | |
|---|---|---|---|
| 5,398,289 A | | 3/1995 | Rourke et al. |
| 5,650,857 A | * | 7/1997 | Cole et al. .................... 358/296 |
| 5,659,767 A | * | 8/1997 | Nguyen et al. .............. 715/515 |
| 5,825,944 A | * | 10/1998 | Wang .......................... 382/309 |
| 5,887,088 A | * | 3/1999 | Kurokawa et al. ........... 382/317 |
| 5,931,586 A | * | 8/1999 | Kashiwazaki et al. ........ 400/61 |
| 5,991,783 A | * | 11/1999 | Popa et al. .................. 715/522 |
| 6,006,013 A | | 12/1999 | Rumph et al. |
| 6,466,954 B1 | * | 10/2002 | Kurosawa et al. ........... 715/520 |
| 6,862,103 B1 | * | 3/2005 | Miura et al. ................ 358/1.15 |

FOREIGN PATENT DOCUMENTS

EP 971309 A2 * 1/2000

* cited by examiner

*Primary Examiner*—Douglas Q. Tran
(74) *Attorney, Agent, or Firm*—Schiff Hardin LLP

(57) ABSTRACT

A method for producing and outputting at least one printed page is provided in which at least one printed page containing several blocks is produce using a first program module. Each block contains first image data of image elements. A representation parameter characterizing image characteristics of a particular block is assigned to each block. An outputting unit outputs image elements on the basis of second image data. The image characteristics of these image elements are determined by outputting parameters. Second image data are produced block by block from first image data using several image processing procedures according to the outputting parameter of the outputting unit. The outputting unit outputs the printed page together with the second image data.

25 Claims, 6 Drawing Sheets

METHOD FOR PRODUCING AND OUTPUTTING AT LEAST ONE PRINTED PAGE

BACKGROUND OF THE INVENTION

1. Field of the Invention

The invention is directed to a method for creating and outputting at least one print page. At least one print page that contains a plurality of blocks is created with the assistance of a first program module. Each block contains first image data of picture elements. An output unit outputs picture elements, whose image properties are determined by output parameters, on the basis of second image data. The output unit outputs the print page with the image data adapted to the output parameters. The invention is also directed to a computer program as well as to a system for implementing the method.

2. Description of the Related Art

In data processing systems, image data of print pages are output on output units, for example, on picture screen and on printers. The print pages are created with the assistance of a first program module (e.g., with a text processing program) with a forms editor or with a desk top publishing (DTP) program module. These image data must be converted for outputting the image data so that the respective output unit can process these data. This conversion is implemented, for example, with the assistance of a printer driver program module given output of the print page by a printer or with the assistance of a picture screen driver program module given output of the print page on a display unit. Printer driver and picture screen driver program modules are also referred to as "drive program modules".

A respective printer driver program module is present for different printers having different output parameters as well as for different printer types. The output parameters of the printer can be pre-set for all print pages to be printed in the printer driver program module, preferably in forms of the printer driver, what are referred to as "register cards" of the printer driver. Standard parameters such as the contrast, the brightness, a reduction of the possible output resolution of the printer, the paper feed, the desired color mixing and the desired printing density can thereby be pre-set. Depending on the printer type, settings for activating duplex printing methods, for activating color printing as well as for color matching are also possible.

When creating the print pages in the first program module, pre-existing blocks that contain image data of picture elements are inserted and arranged. Given inserted blocks, particularly given inserted pictures and graphics, the image parameters of the blocks differ, particularly in terms of the image parameters of resolution and color depth, from the output parameters of a printer on which the blocks are output together with further blocks of the print page. The specific printer on which the print pages will be output has often not been determined when creating the print pages since the output of the print pages often does not ensue immediately after the creation of the print page but at a much later time and with the assistance of a further data processing system. As a consequence of the different output parameters of the available printers on which the print page can be output, the output parameters have often not been determined when the print page is created. The image parameters of the blocks can therefore not be adapted at this time to the output parameters of the printer when the print page is created.

The blocks usually have image parameters that the available printers are often incapable of presenting. Thus, for example, standard resolutions of pictures and graphics in image production and in image processing are 1200 through 9600 dots per inch (dpi). Color depths between 8 and 24 bits are standard. A color depth of 8 bits means that, for example, a dot can be presented in 256 different colors or in 256 different gray scales. Typical printers, however, usually have a resolution of only 150 through 600 dpi given a color depth of 1 through 8 bits. For printers that can only output one color, for example black, such printers must convert the colors into gray scales and, potentially, convert the gray scales into a black-and-white graphics with the assistance of a rastering process, and in addition must reduce the resolution. A color allocation must be made given multi-color (e.g., two-color) printing.

The information contained in the image data of the blocks are reduced in the reduction of the resolution and in a necessary color conversion. It is therefore also not meaningful to uniformly modify the image data of the blocks to, for example, 600 dpi and to a color depth of 8 bits when creating the print page. If, namely, the printer can only output a resolution of 300 dpi, then the image data of all blocks must be converted again. For example, in this situation, the image data of a graphics with a resolution of 1200 dpi are converted into image data of a graphics with a resolution of 600 dpi; for output on the printer, image data of a graphics with 300 dpi must be generated. Two conversion events of the 1200 dpi graphics are thus needed. Information is lost in every conversion. When converting the graphic from 600 dpi to 300 dpi, all information that are contained in the original 1200 dpi graphic are no longer available. A graphic with 300 dpi that has been produced from the graphic with 1200 dpi using two conversion steps is qualitatively poorer than a graphic with 300 dpi that has been produced from the image data of the graphic with 1200 dpi in a single conversion step during the conversion.

In some blocks, references to image data in data sources are inserted into the print page instead of the image data when creating the print page. The image data of the blocks specified by the references are then read in from the data sources shortly before the printout and are adapted to the output parameters of the output unit together with further image data and are output.

The print page that has been created can be output at different output units that make variously strict demands of the quality of the image data. In order to avoid a high information loss, the image data must be made available with high quality. Accordingly, it is not expedient—as in the Prior Art—to already make the image parameters of these print data uniform when creating the print pages and/or to adapt them to the output parameters of the output unit. The current data with the image parameters with which they are available in the data source are added to the further image data of the print page shortly before the printout.

U.S. Pat. No. 5,398,289 discloses a method and a system in which a document generated by an operator with the assistance of a program module is output object optimized. Object-oriented reproduction instructions for specifying the object can be generated by the operator when drafting the document or can be automatically generated. An output device makes reproduction and compression techniques for the object-oriented output available using specific hardware and software modules. The respective object is processed in the output unit on the basis of the reproduction instructions with the assistance of reproduction and compression techniques before being output.

SUMMARY OF THE INVENTION

An object of the invention is to provide a method for creating and outputting a print page in which an output of the image data at the output unit ensues with a qualitatively high-grade appearance for the viewer.

This object is achieved by a method for creating and outputting at least one print page, comprising creating at least one print page that contains a plurality of blocks with the assistance of a first program module; allocating a presentation parameter to each of the plurality of blocks, wherein each block contains first image data of picture elements, and the presentation parameter characterizes the image properties of each block; outputting picture elements by an output unit based on second image data, the image properties of the picture elements being determined by output parameters; generating, by a plurality of image processing procedures, second image data corresponding to an output parameter of the output unit from first image data; selecting, by a second program module, one of the image processing procedures dependent on the presentation parameter; converting image data block-by-block by the second program module; and outputting, by the output unit, the print page with the plurality of blocks. The inventive method may further comprise providing a plurality of conversion procedures contained within the image processing procedure selected with the assistance of the presentation parameter and the output parameter; and determining, by the presentation parameter P, a sequence of the conversion procedures and pre-sets of the conversion procedures. The method may further comprise changing image data in the image processing procedure utilizing at least one of procedures for soft drawing, hard drawing, edge smoothing, font smoothing, segmenting, color depth modification, resolution modification, brightness modification, contrast modification, and color intensity modification. The inventive method may further comprise providing to the image processing procedures further properties comprising at least one of a nature of a fixing drum, a hardness of the fixing drum, a data format of the output device, performance features of a control unit of the output unit for image processing, properties of a carrier material, and settings for color management in the conversion of the images for output on an output unit. The inventive method may also comprise the step of implementing changes of image data in a first image processing procedure with at least one of a different intensity and with different pre-sets compared to individual changes of the image data in other image processing procedures. Additionally, the inventive method may further comprise defining a presentation parameter when creating the print page. A print page may also be created that is independent of the output parameters of the output unit with the assistance from the first program module. The output unit may be a printer device. At least one of the plurality of blocks may contain graphics elements selected from the group consisting of text, vector graphics, business graphics, pictures, tables, landscape photos, and portrait photos. The output parameters may contain at least one of resolution, color depth, type of printer software, version of the printer software, printer language, image processing capability, drum type, and output medium of the output unit. The first program module may be selected from the group consisting of a text processing program module, a DTP program module and a forms generator. Data sources (which may be data banks and image data sources) may be used for inserting image data of the blocks. The inventive method may further comprise utilizing a reference that references image data in the data source as a block, and may further comprise loading the image data of the blocks by the second program module before conversion; and inserting the image data of the blocks into the print page instead of the reference. Some of these blocks may contain variable data. Variable data may be inserted into the print page before creating the second image data of the blocks—these image data blocks may be created with variable data utilizing a third program module; this third program module may be configured to output the created image data, being adapted to the output parameters of the output unit. The inventive method may further comprise adding the image data output adapted by the third program module to the second image data converted block-by-block before the output of the image data on the output unit. The inventive method may further comprise utilizing third program modules for generating the second image data via the image processing procedures, with whose assistance the first image data were created; and exchanging data with the third program modules with assistance of data exchange interfaces. The first and second program modules may be processed in separate computing units of a data processing system. The inventive method may further comprise implementing changes of image data in a first image processing procedure with at least one of a different intensity and with different pre-sets compared to individual changes of the image data in other image processing procedures.

The invention also contemplates computer software comprising commands and data in encoded form that, after a loading of the computer software, is configured to implement the methods described above. This computer software may be stored on a storage medium.

The invention is also directed to a system for creating and outputting at least one print page, comprising: a first program module configured to assist in creating at least one print page that comprises a plurality of blocks, each of these blocks containing first image data of picture elements, each block also having allocated to it a presentation parameter that characterizes image properties of the block; an output unit configured to output picture elements based on second image data, the image properties of the picture elements being determined by output parameters, the output unit being configured to output a print page comprising the plurality of blocks; a plurality of image processing procedures configured to respectively generate second image data corresponding to an output parameter of the output unit from first image data; and a second program module configured to select one of the procedures dependent on the presentation parameter and implement the image data conversion block-by-block. The inventive aspects are discussed in more detail below.

The inventive method permits an operator to allocate a presentation parameter to each block when creating the print page. This presentation parameter can have, for example, the form of a numerical code or of a text code that describes the block content. The presentation parameters have image processing procedures allocated to them in the second program module that are automatically implemented upon conversion of the image data of the individual blocks. The image parameters such as the resolution and the color depth are not only adapted to the output parameters of the output unit; rather, the image data of individual blocks are automatically converted according to individual prescriptions and are automatically post-processed with image processing methods. Further output parameters of the output unit are taken into consideration upon implementation of these image processing methods, for example, the nature and strength of the fixing drum as well as the properties of the carrier material when outputting the print page at a printer.

The allocation of the presentation parameter can also ensue automatically with the assistance of specific features of the image data, for example, the data type of the inserted image data. This individual adaptation of the image data and the automatic selection of suitable image processing procedures creates a qualitatively high-grade appearance of the individual blocks on the print page that is output. Depending on the presentation parameter, the specified image processing procedure can contain known methods such as methods for edge smoothing, for font smoothing, for soft drawing, for color correction, for dithering and for modifying color transitions. These known methods can be combined and/or differently configured in the allocated image processing procedures. The sequence of the implementation of these known methods can also vary in the individual image processing procedures.

It is also advantageous to have parts of the image processing procedure implemented by third program modules. The image data and the output parameters relevant for the conversion are handed over to one such third program module. In, for example, the operating system "Microsoft Windows", one such data exchange interface is the OLE data exchange interface (object linking and embedding). It is thus also possible to have the image data that are created with the third program module converted by this third program module. To that end, for example, the image data of a circle diagram that are created with the assistance of the Microsoft Excel program module are handed over to this for conversion together with the relevant output parameters. The converted image data are then transmitted to the output unit and output by it.

In an advantageous embodiment of the invention, the respective presentation parameter selects image processing procedures that contain different pre-sets for the conversion. Thus, for example, it is possible to adapt the presented brightness of individual blocks of the print page individually for each block in the conversion. To that end, different presentation parameters are allocated to the blocks, different image processing procedures being in turn allocated to these presentation parameters. These image processing procedures usually differ in terms of the pre-sets of a brightness correction method. These different pre-sets of image processing procedures can also be pre-set for all other adaptation and correction methods. Pre-sets are thereby also possible that deactivate individual adaptation and correction methods.

These measures allow very different effects to be achieved using the adaptation and correction methods. This permits an operator, without further effort, to already optimize the effect of the respective block on a viewer using the allocation of the presentation parameter when creating the print page, even though the output parameters of the output on which the print page is output at a later time have not yet been determined.

It is also advantageous to utilize the inventive method given image data of blocks that contain text, vector graphics, business graphics, pictures, tables landscape photos and/or portrait photos. With such image data, a phenomena can occur given a conversion of all blocks according to a uniform method—as in the Prior Art—where image data of individual blocks are output in an inferior way, even though the output unit, for example, the printer, could output these image data qualitatively better. An individual, automatic conversion with the assistance of the inventive method achieves an optimum conversion of the respective image data.

In a development of the invention, the print page is created with the assistance of a first program module, for example, with the assistance of a text processing program module, a DTP program module and/or a forms generator, by which the blocks are inserted by references to data sources, for example, to data banks, to image data banks or to data files with the assistance of the first program module. Data exchange interfaces arranged in program modules are especially suited for the insertion of such data. In, for example, program modules of the operating system "Microsoft Windows", one such data exchange interface is the OLE data exchange interface. What this achieves is that blocks are inserted into the print page that are loaded from the data source immediately before the conversion and before the output of the print page. Image data are thus inserted that agree with current image data of the data source at the time the print page is printed out. The outlay for maintaining data and print masters is thus reduced since all print pages need not be checked and adapted given a change; rather, only the entries in the data sources need be changed.

In an advantageous development of the invention, the relevant output parameters of the output unit are also handed over given a demand for a customized graphic, for example, from variable data in a third program module. The graphic that is created in a customized fashion is then already created according to the output parameters of the output unit. What is thus achieved is that the program module information for these image data are generated according to the output parameters of the output unit. The third program module contains suitable methods with pre-sets that are especially suited for the conversion of these image data. A further adaptation of these image data to the output parameters of the output unit is not required in this case, thus eliminating the need for such a further adaptation. The handover of the data to the third program module preferably ensues with the assistance of a data exchange interface of the third program module, for example, with the OLE data exchange interface.

DESCRIPTION OF THE DRAWINGS

Further features and advantages of the invention derive from the following description that explains the invention on the basis of an exemplary embodiment in conjunction with the attached drawings, in which.

DETAILED DESCRIPTION OF THE INVENTION

Figure 1:
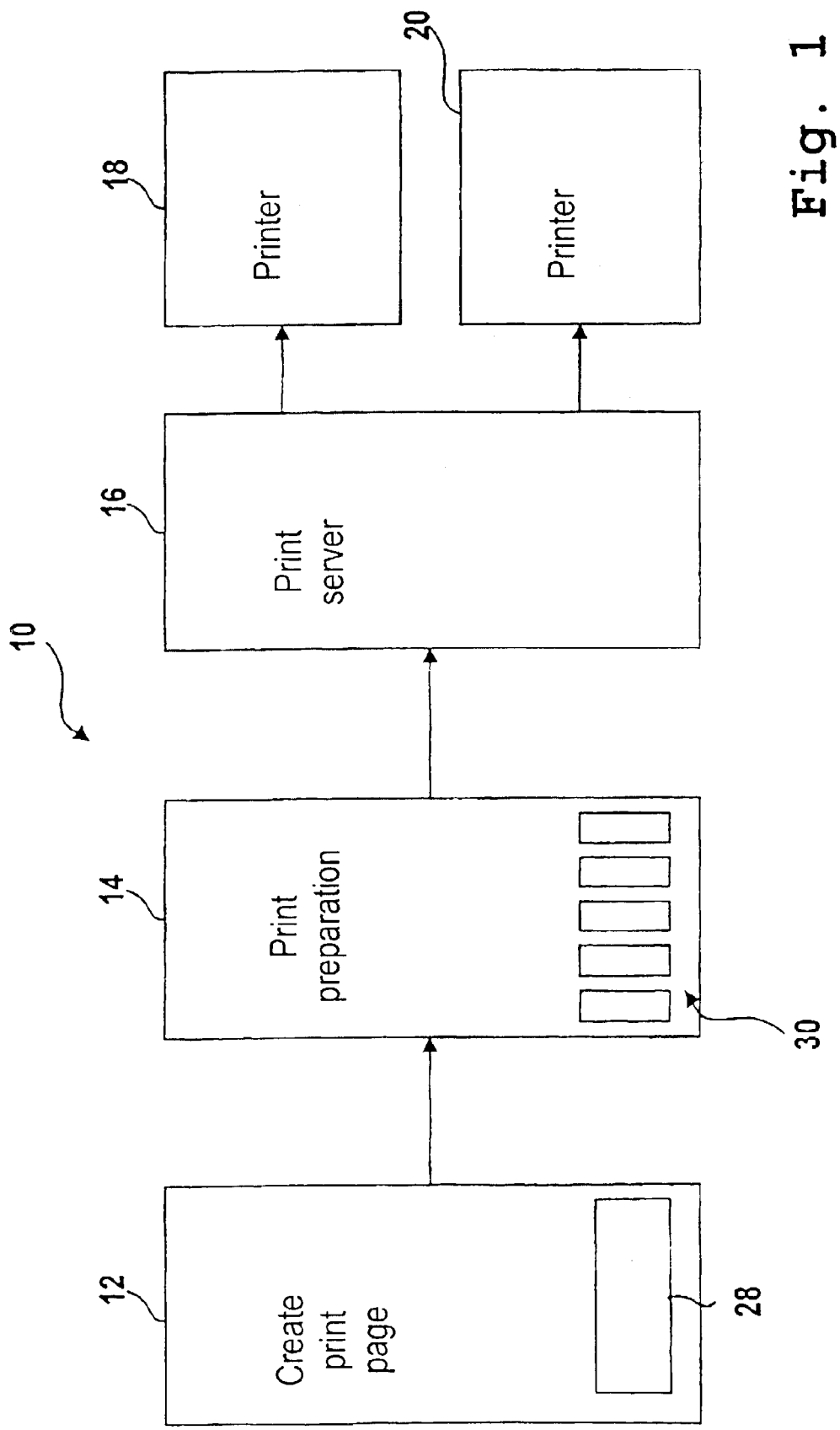
FIG. 1 is a block diagram illustrating a system according to a first embodiment of the invention with which a print page is created, edited and printed out.

FIG. 1 shows a computer system 10 with which a print page is created and with which this print page is edited and printed out according to a first embodiment of the invention. The print page is created by an operator with the assistance of a first "forms editor" program module 28. The forms editor program module 28 is processed by a first computer 12. The print page is created independently of an output device on which this print page is output at a later time. A second computer 14, the print preparation computer, is connected to a third computer 16, the print server, to which two printers 18 and 20 are connected. The print preparation computer 14 contains a plurality of image processing procedures 30 that are processed together with further program modules (not shown).

The print data generated with the assistance of the forms editor program module 28 are transmitted from the first computer 12 to the print preparation computer 14. At a much later time, an operator provides the instruction to the print preparation computer 14 via the input unit (not shown) to output the print page on the printer 18. Subsequently, the data of the print page are converted with the assistance of the image processing procedures in the print preparation computer 14 into second data such that the data can be further-processed by the printer 18 and output as a print page. In a printer language of the printer 18, the second data are transmitted to the print server 16 that forwards them to the printer 18. The printer language of the printer is a data format in which the second data are transmitted and further-processed. Such printer languages are, for example, the PCL printer language, the AFP printer language and the PostScript printer language.

The printer 18 can output print pages with a resolution of 300 dpi black/white. The printer 20 can output print pages with a resolution of 800 dpi in two-color printing, what is referred to as "highlight color" printing. These operation-conditioned properties of the printers 18, 20 are referred to as output parameters. The operator can also provide the print preparation computer 14 with the instruction to output the image data on the printer 20.

Figure 6:
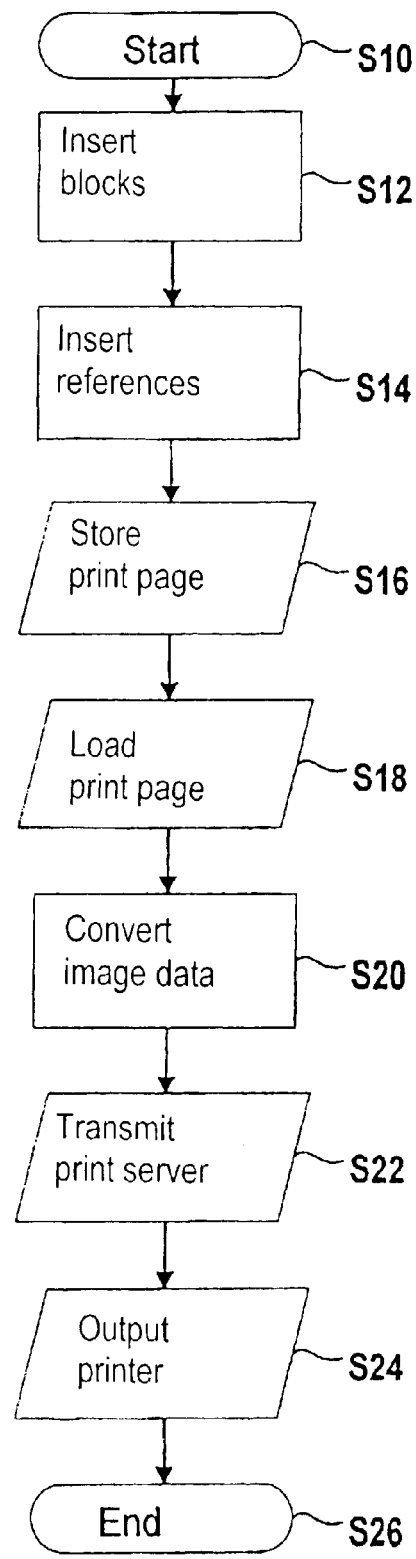
FIG. 6 is a flowchart for creating and outputting a print page according to an embodiment of the invention.

FIG. 6 shows a flowchart for creating and outputting a print page. The executive sequence is started in step S10. In step S12, the operator arranges a plurality of blocks that respectively contain image data on the print page to be created—explained below.

The image data of the blocks output by a data source are inserted into the print page taking image parameters such as size and/or scaling of the block into consideration. Typically, each block has a rectangular shape. However, other shapes are possible. Other image parameters such as resolution and color depth are retained so that the maximally available information of the image data are preserved in the way they originate from the data source. The operator allocates a respective presentation parameter P to these blocks.

In step S14, the operator enters references into the print page that specify data in data sources. These data sources store image data of blocks that are added at a later time to the image data inserted in step S12. However, the operator already defines the size and the position of the block as well as a presentation parameter P at this time. Such an insertion is also referred to as embedding and can, for example, ensue with the assistance of an OLE data exchange interface. The data of the print page that contain the image data and the data of the references are stored in the first computer in the step S16.

In step S18, the print preparation computer 14 loads these data. The image data that are specified by references are loaded from the data sources by the print preparation computer 14. In step S20, all image data are converted block-by-block by a respective image processing procedure 30 such that the image data of the respective block correspond to the output parameters of the selected printer 18. The data format of the converted blocks corresponds to the printer language of the printer 18. However, it is also possible to convert the data block-by-block with the assistance of the image processing procedures 30 and to subsequently convert all converted image data in to data that correspond to the printer language with the assistance of a further program module. The selection of the image processing procedure 30 ensues with the assistance of the presentation parameter P allocated to the respective block. The converted, second image data are transmitted in step S22 from the print preparation computer 14 to the print server 16 that forwards them to the printer 18. In step S24, the image data of the print page are output on a carrier material with the assistance of the printer 18. The execution ends in step S26.

Figure 4:
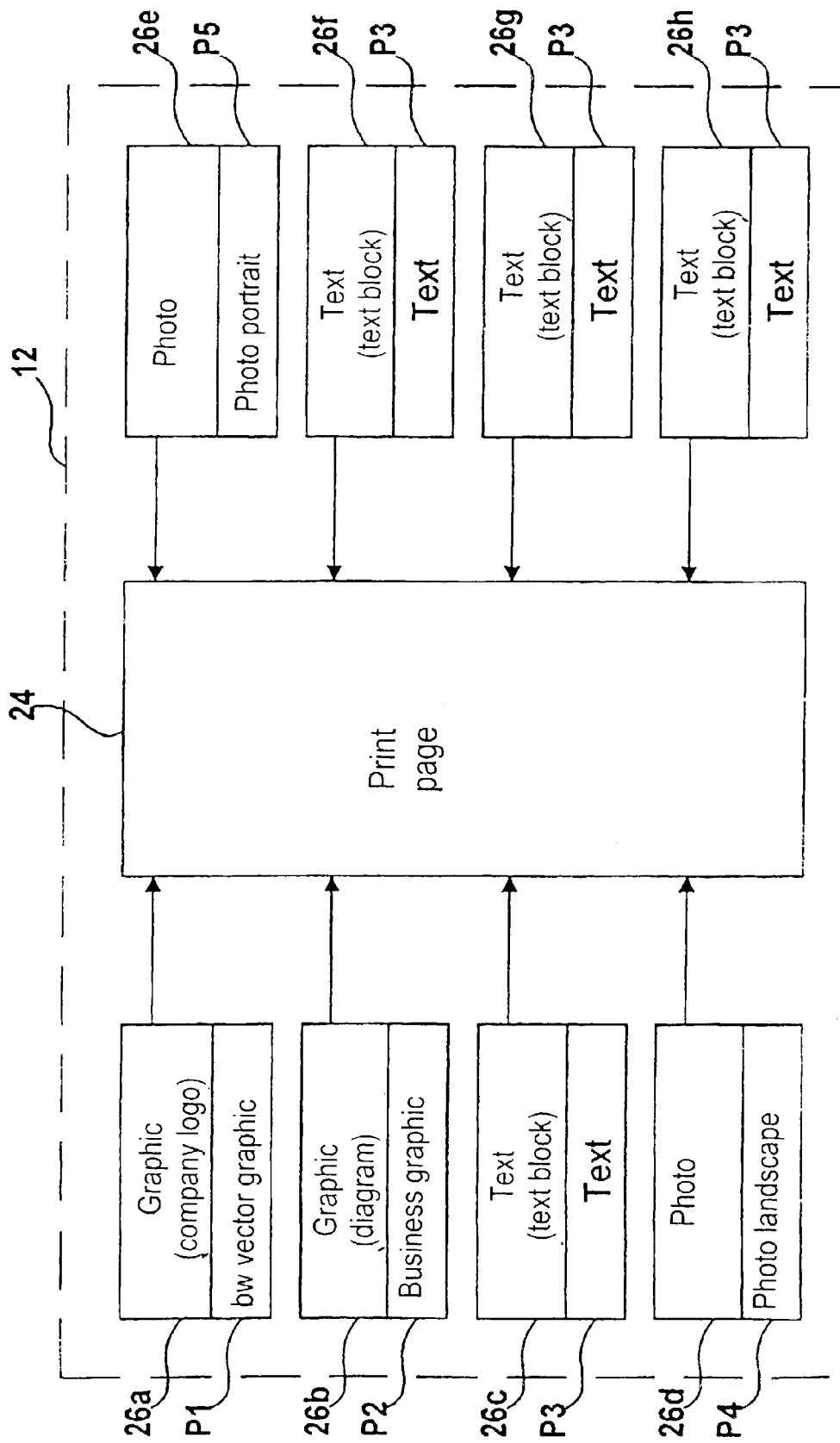
FIG. 4 is a block diagram illustrating the creation of the print page with the assistance of a first program module.

FIG. 4 schematically shows how an exemplary print page 24 might be created with the assistance of the first computer 12. The blocks 26*a* through 26*h*—referenced overall as 26—that are to be inserted into the print page are loaded from data sources or are created by an operator with the assistance of functions contained in the forms generator program module 28. The loaded blocks 26 are adapted with further functions of the forms generator program module 28, (e.g., in shape and size) by these functions in conformity with the ideas of the operator and are arranged on the print page 24. During adaptation of the individual blocks 26, the operator assigns a presentation parameter, referenced P overall, to each block. With the assistance of this presentation parameter P, the operator classifies the illustrated blocks 26 according to specific image properties.

Thus, a block 26*a* having a graphic of a company logo is arranged on the print page 24. The operator assigns the presentation parameter P1 with the connotation "black/white vector graphic" to this graphic 26*a*. A further block 26*b* with graphic, namely a diagram, is arranged on the print page 24; the operator assigns the presentation parameter P2 having the attribute "business graphic" to it. The operator arranges the blocks 26*c*, 26*f*, 26*g*, 26*h* on the print page 24 and provides them with the presentation parameter P3 having the connotation "black text". The operator arranges a block 26*d* and a block 26*e* that both contain photos on the print page 24. The operator assigns the presentation parameter P4 with the connotation "photo landscape" to the block 26*d* and the presentation parameter P5 with the connotation "photo portrait" to the block 26*e*.

Figure 5:
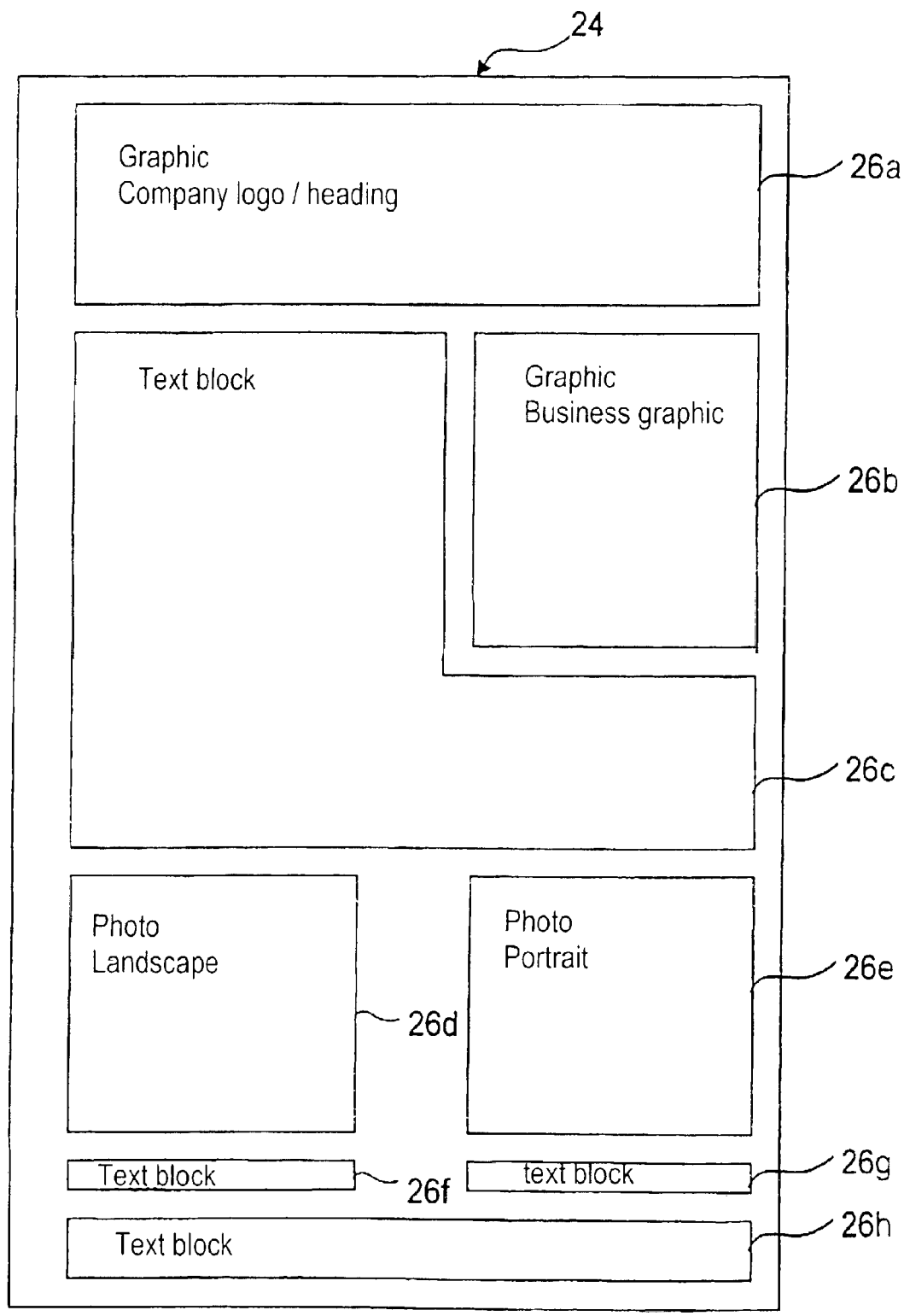
FIG. 5 is a layout of the print page that is created with the assistance of the first program module and output with the assistance of the output unit.

FIG. 5 shows an arrangement of the blocks 26*a* through 26*e* on the print page 24 as rectangles by way of example. As previously mentioned, the shape of the blocks 26 is not limited to rectangles. They can have any arbitrary shape. For example, they can thus also be circular or arbitrarily shaped polygons.

The print page 24 that was created with the assistance of the first computer 12 is transmitted to a print preparation computer 14 given the arrangement in FIG. 1. At a later time after the transmission, the print page 24 is adapted on the print preparation computer 14 to the output parameters of the printer 18 and is output by the latter. The procedure of adapting and outputting the print page 24 is activated by an operator by inputting an instruction with the assistance of the input unit of the print preparation computer 14. This instruction always defines which printer 18, 20 will output the print page 24 that has been created. The output parameters and further parameters such as the printer language, the nature and the hardness of the fixing drums, the nature and the properties of the carrier material, the color settings (the color management) of the printers 18, 20 connected to the print server are stored in the print preparation computer 14. The output parameters and the further parameters of the printers are referred to below as "output parameters".

Furthermore, the image processing procedures 30 are stored in the print preparation computer 14 and can be processed by this print preparation computer 14. Respectively one of the image processing procedures 30 is allocated to the presentation parameters P1 through P5. The output parameters of the selected printer 18, particularly the presentable resolution and the presentable color depth, are taken into consideration in the image processing procedures 30; for example, they are pre-set. The image data of the print page 24 are converted block-by-block in the print preparation computer 14 into second image data by image processing procedures 30. These second data are stored overall as a second print page in the print preparation computer 14 and are forwarded to the print server 16 after the conversion of all image data. The print server 16 forwards these second data to the selected printer 18. The selection of the image processing procedure 30 ensues with the assistance of presentation parameter P1 through P5 allocated to the respective block 26. When the operator has not assigned a presentation parameter P to a block 26, the a presentation parameter P0 is automatically allocated to this picture element 26. The conversion of the first image data of the block 26 into second image data then ensues with the assistance of an image processing procedure allocated to the presentation parameter P0.

For performance reasons, the image data of blocks 26 can also be adapted to the output parameters of the printer 18, 20 in a control unit of the printer 18, 20 when this control unit can execute suitable image processing methods. The image processing procedure 30 selected on the basis of the presentation parameter P checks whether the selected printer 18, 20 can convert the image data in the control unit of the printer 18, 20. When this is the case, the image data are handed over to the printer 18, 20 for the conversion and printout. When the printers 18, 20 and the printer language employed support the processing of objects to be reproduced dependent on object-specific reproduction instructions, then these reproduction instructions can also be automatically generated from the presentation parameters P. Otherwise, these image data are converted by the image processing methods of the image processing procedure 30 and are subsequently transmitted to the printer 18, 20.

For example, the image data of the block 26d that define a landscape photo and by which the presentation parameter P4 with the image property "photo landscape" is allocated to this block 26d are converted in the print preparation computer 14 such that the image parameters of the landscape photo agree with the output parameters of the printer 18 after the conversion. To this end, the image processing procedure 30 for converting the image data that is allocated to the presentation parameter P4 "photo landscape" is selected. Upon creation of the print page 24, the landscape photo was inserted into the print page 24 with a resolution of 1200 dpi and an 8-bit color depth. The printer 18, however, can only output single-color print pages, i.e., a color depth of one bit, with a resolution of 300 dpi. With the selection of the printer 18, the resolution of 300 dpi and the color depth of one bit have been pre-set in the image processing procedures 30 selectable by the presentation parameters P. The conversion is automatically undertaken by the image processing procedure 30 selected by the presentation parameter P4.

Given the image processing procedure 30 having the connotation "photo landscape" selected by the presentation parameter P4, a dithering method is also applied in addition to a method for the conversion of the resolution. With the assistance of raster cells, the dithering method transfers the colors of the landscape photo in a raster of black/white picture elements. The parameters of the dithering method are pre-set in this image processing procedure 30 such that a viewer perceives the printout of the landscape photo as a plurality of gray scales due to the rastering. Given color prints, the rastering ensues individually for each available process color. Subsequently, the selected image processing procedure 30 also converts the image data with the assistance of a soft drawing method, so that—following the conversion—the picture elements that are presented have only gradual gray scale transitions due to the black/white raster that is presented. Due to the conversion with the assistance of the soft drawing method, the impression of a qualitatively high-grade image is conveyed to the viewer in the case of the landscape photo. Compared to mere adaptation of the resolution and/or of the color depth, the landscape photo has thus been improved by the implemented soft drawing method. The soft drawing method as well as further correction methods can already be co-considered in the implementation of the dithering method in other embodiments of the invention.

Given the conversion of the image data of the block 26b, which represents a circle diagram, the image processing procedure 30 allocated to the presentation parameter P2 having the connotation "business graphic" is activated on the basis of this presentation parameter P2. The circle diagram 26b has been inserted into the print page 24 with a resolution of 600 dpi and with a 4-bit color depth and must be adapted by the selected image processing procedure 30 to the output parameters black/white given a resolution of 300 dpi. As in the processing of the block 26d, the image processing procedure 30 implements an adaptation of the resolution and a dithering method with the assistance of a known method. The dithering method converts the 16 colors into a black/white raster that offers 16 gray scales to the viewer of the image 16 that is output. Subsequently, the image data are processed with the assistance of a hard drawing method and an edge smoothing method such that the viewer perceives precise gray scale transitions as well as precise and straight lines.

Due to the fixed allocation of a respective image processing procedure 30 to a predetermined presentation parameter P, it is possible to automatically implement further corrections of the image data in the adaptation of the resolution and/or of the color depth. The correction methods enable an advantageous presentation of the image data output on the selected printer 18. Known image processing methods are applied that are automatically activated and implemented in the conversion of the image data according to the inventive data.

Figure 2:
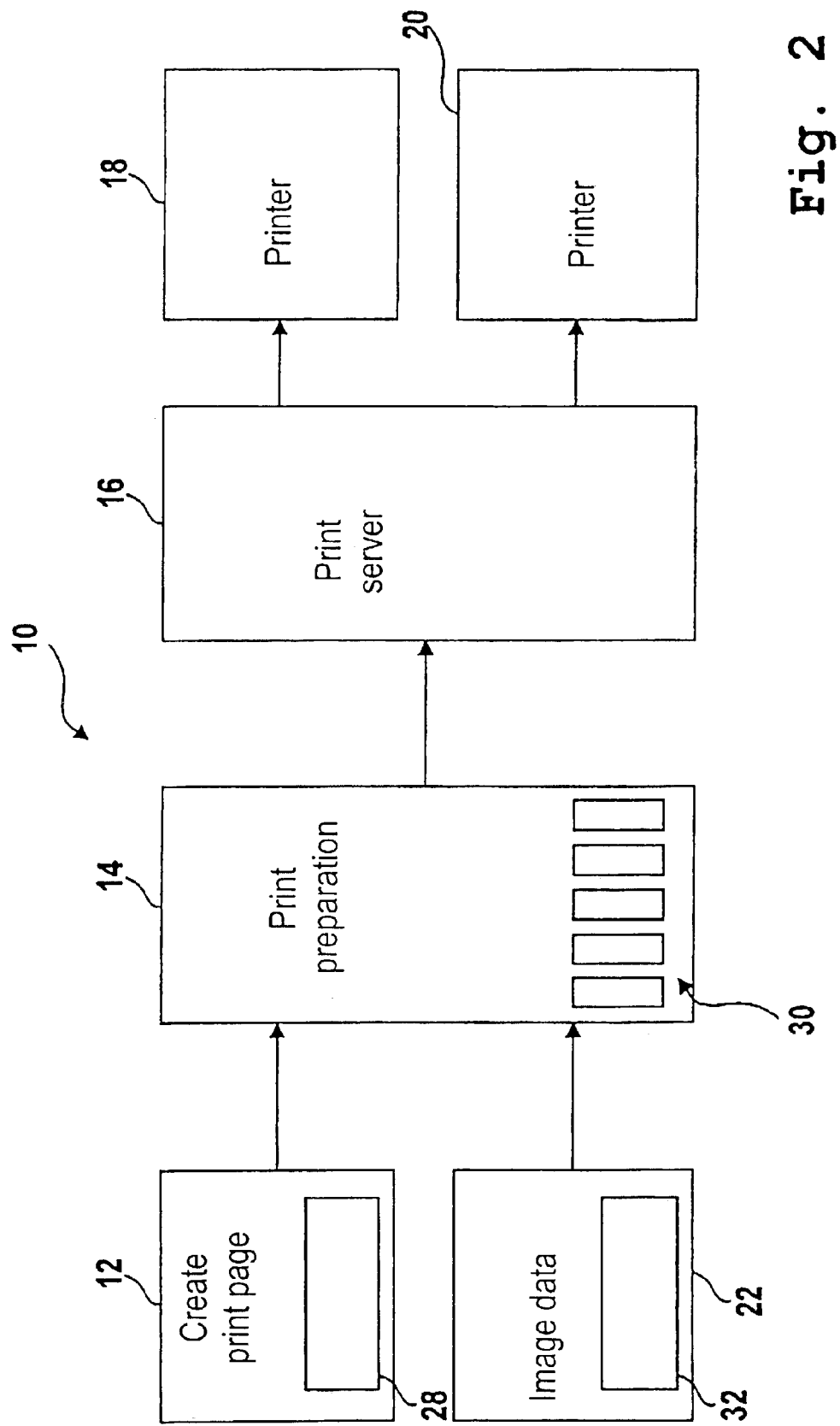
FIG. 2 is a block diagram illustrating a system similar to that of FIG. 1 in a second embodiment of the invention.

FIG. 2 shows a further version of the embodiment of the invention according to FIG. 1 for creating and outputting the print page 24. In addition to the elements described according to FIG. 1, the arrangement according to FIG. 2 contains a further computer 22 that generates image data from data stored in a data bank with the assistance of a diagram generation program module 32. When output on the printer 18, these image data yield a circle diagram similar to the block 26b. Upon creation of the print page 24, however, a reference to the diagram generation program module 32 is inserted instead of the block 26b with the circle diagram. This reference contains particulars about the data source of the data to be presented in the circle diagram as well as the dimensions of the circle diagram with which it is to be inserted into the print page 24. As a result, it is possible to insert a circle diagram into the print page 24 that has been created with current data shortly before the time of the printout. The image data of the circle diagram are added after the creation of the image data of the other blocks and, as in FIG. 1, are output to the pre-set printer 18. The data exchange with the diagram generation program module may ensue via the OLE data exchange interface. However, the data exchange can also ensue with the assistance of a different data exchange interface of the program module 32.

Figure 3:
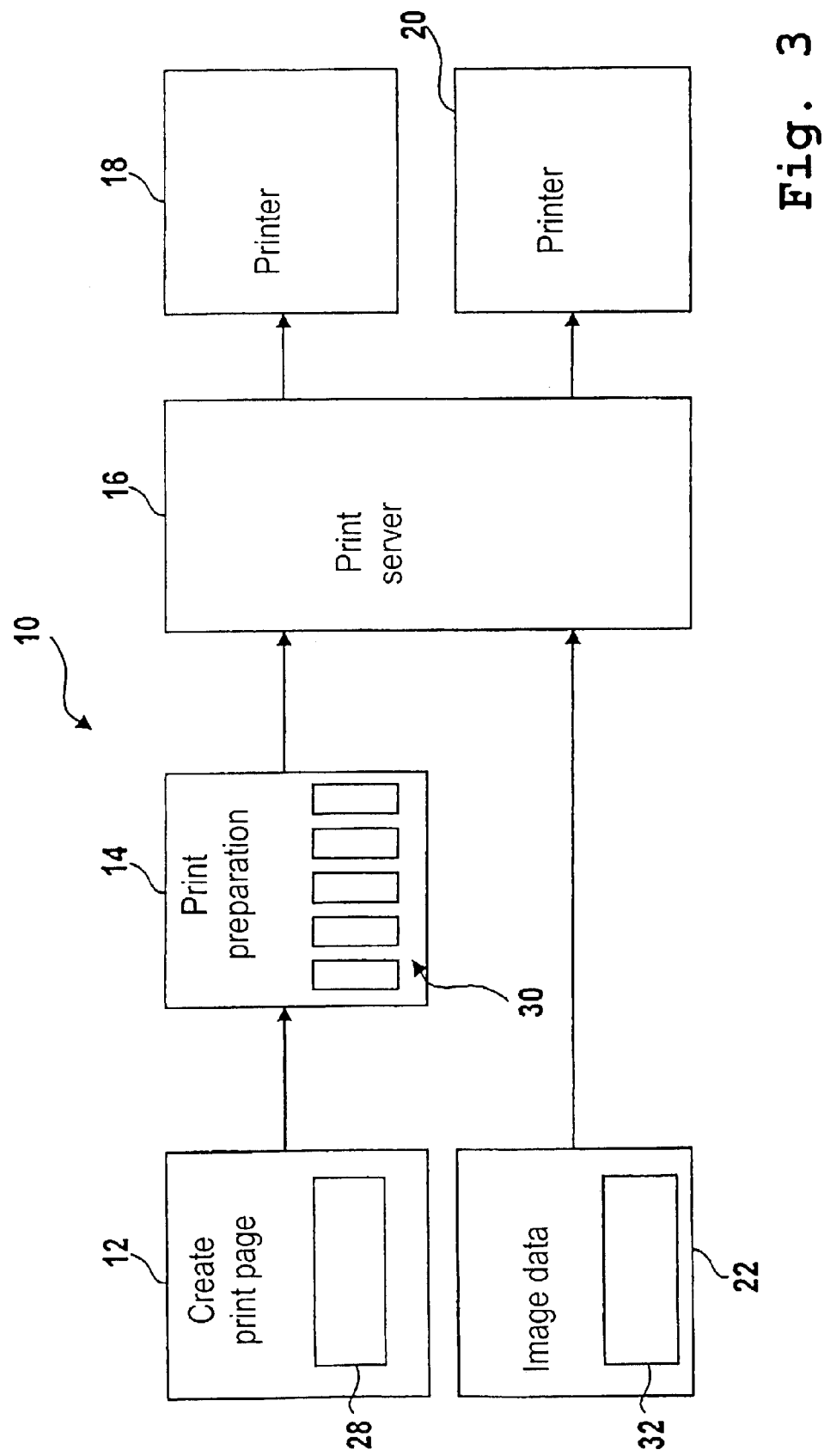
FIG. 3 is a block diagram illustrating a system according to FIG. 1 in a third embodiment of the invention.

FIG. 3 shows the computer system 10 in a third embodiment of the invention. As in the second embodiment of the invention that is shown in FIG. 2, image data are generated by a computer 22 and are inserted into the print page 24 only shortly before the output. The request of the image data at the computer 22 additionally contains the output parameters of the printer 18 on which the print page 24 is output. With the assistance of the diagram generation program module 32, the computer 22 generates the requested image data, whose image properties correspond to the output parameters of the selected printer 18. It is thus no longer necessary to have these data converted by the print preparation computer 14. The image data generated in the computer 22 are directly supplied to the print server 16 and are output on the carrier material by the printer 18 together with the other image data.

When image data from datafiles are inserted, then it is also possible to automatically allocate the presentation parameter P to these image data on the basis of their datafile type. The presentation parameter P can also have been allocated in the creation of the image data and stored together with the image data, for example in a data bank. The manual allocation of the presentation parameter P by the operator when creating the print page 24 is then eliminated for these blocks.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

LIST OF REFERENCE CHARACTERS 10 system
12 first computer
14 print preparation computer
16 print server
18, 20 printer/outputting unit
22 computer
24 print page
26a–26h blocks
28 first program module
30 image processing procedures
32 diagram generation program module
S10–S26 executive sequence steps
P1–P5 presentation parameters

What is claimed is:

1. A method for creating and outputting at least one print page, comprising:
    creating at least one print page that contains a plurality of blocks with the assistance of a first program module;
    manually allocating a presentation parameter to each of the plurality of blocks by a user at a time of document creation, wherein each block contains first image data of picture elements, and the presentation parameter characterizes the image properties of each block;
    outputting picture elements by an output unit based on second image data, the image properties of the picture elements being determined by output parameters;
    generating, by a plurality of image processing procedures, second image data corresponding to an output parameter of the output unit from first image data;
    selecting, by a second program module, one of the image processing procedures dependent on the presentation parameter;
    converting image data block-by-block by the second program module; and
    outputting, by the output unit, the print page with the plurality of blocks.

2. The method according to claim 1, further comprising:
    providing a plurality of conversion procedures contained within the image processing procedure selected with the assistance of the presentation parameter and the output parameter; and
    determining, by the presentation parameter, a sequence of the conversion procedures and pre-sets of the conversion procedures.

3. The method according to claim 1, further comprising:
    changing image data in the image processing procedure utilizing at least one of procedures for soft drawing, hard drawing, edge smoothing, font smoothing, segmenting, color depth modification, resolution modification, brightness modification, contrast modification, and color intensity modification.

4. The method according to claim 1, further comprising:
    providing to the image processing procedures further properties comprising at least one of a nature of a fixing drum, a hardness of the fixing drum, a data format of the output device, performance features of a control unit of the output unit for image processing, properties of a carrier material, and settings for color management in the conversion of the images for output on an output unit.

5. The method according to claim 3, further comprising: implementing changes of image data in a first image processing procedure with at least one of a different intensity and with different pre-sets compared to individual changes of the image data in other image processing procedures.

6. The method according to claim 1, further comprising defining a presentation parameter when creating the print page.

7. The method according to claim 1, further comprising creating a print page that is independent of the output parameters of the output unit with the assistance from the first program module.

8. The method according to claim 1, wherein the output unit is a printer device.

9. The method according to claim 1, wherein at least one of the plurality of blocks contains graphics elements selected from the group consisting of text, vector graphics, business graphics, pictures, tables, landscape photos, and portrait photos.

10. The method according to claim 1, wherein the output parameters contain at least one of resolution, color depth, type of printer software, version of the printer software, printer language, image processing capability, drum type, and output medium of the output unit.

11. The method according to claim 1, wherein the first program module is selected from the group consisting of a text processing program module, a desk top publishing (DTP) program module and a forms generator.

12. The method according to claim 1, further comprising inserting image data of the blocks from data sources.

13. The method according to claim 12, wherein the data sources are data banks and image data sources.

14. The method according to claim 12, further comprising utilizing a reference that references image data in the data source as a block.

15. The method according to claim 14, further comprising loading the image data of the blocks by the second program module before conversion; and
inserting the image data of the blocks into the print page instead of the reference.

16. The method according to claim 1, wherein some of the plurality of blocks contain variable data.

17. The method according to claim 16, further comprising inserting the variable data into the print page before creating the second image data of the blocks.

18. The method according to claim 16, further comprising creating image data of blocks with variable data utilizing a third program module.

19. The method according to claim 18, further comprising outputting the created image data by the third program module adapted to the output parameters of the output unit.

20. The method according to claim 19, further comprising adding the image data output adapted by the third program module to the second image data converted block-by-block before the output of the image data on the output unit.

21. The method according to claim 1, further comprising:
utilizing third program modules for generating the second image data via the image processing procedures, with whose assistance the first image data were created; and
exchanging data with the third program modules with assistance of data exchange interfaces.

22. The method according to claim 1, wherein the first and the second program module are processed in separate computing units of a data processing system.

23. The method according to claim 4, further comprising: implementing changes of image data in a first image processing procedure with at least one of a different intensity and with different pre-sets compared to individual changes of the image data in other image processing procedures.

24. A executable program stored in a computer readable medium for executing a computer comprising:
commands and data in encoded form that, after a loading on a computer, create creating at least one print page that contains a plurality of blocks with the assistance of a first program module;
commands and data in encoded form that, after a loading on a computer, enable a user to manually allocate a presentation parameter to each of the plurality of blocks at a time of document creation, wherein each block contains first image data of picture elements, and the presentation parameter characterizes the image properties of each block;
commands and data in encoded form that, after a loading on a computer, output picture elements by an output unit based on second image data, the image properties of the picture elements being determined by output parameters;
commands and data in encoded form that, after a loading on a computer, generate, by a plurality of image processing procedures, second image data corresponding to an output parameter of the output unit from first image data;
commands and data in encoded form that, after a loading on a computer, select, by a second program module, one of the image processing procedures dependent on the presentation parameter;
commands and data in encoded form that, after a loading on a computer, convert image data block-by-block by the second program module; and
commands and data in encoded form that, after a loading on a computer, output, by the output unit, the print page with the plurality of blocks.

25. A system for creating and outputting at least one print page, comprising:
a first program module configured to assist a user in creating at least one print page that comprises a plurality of blocks, each of these blocks containing first image data of picture elements, each block also having manually allocated to it by a user at a time of document creation a presentation parameter that characterizes image properties of the block;
an output unit configured to output picture elements based on second image data, the image properties of the picture elements being determined by output parameters, the output unit being configured to output a print page comprising the plurality of blocks;
a plurality of image processing procedures configured to respectively generate second image data corresponding to an output parameter of the output unit from first image data; and
a second program module configured to select one of the procedures dependent on the presentation parameter and implement the image data conversion block-by-block.

* * * * *